Patented Mar. 28, 1950

2,502,183

UNITED STATES PATENT OFFICE 2,502,183

PRODUCTION OF CARBON BODIES

Lloyd C. Swallen, Lombard, Ill., assignor to Great Lakes Carbon Corporation, Morton Grove, Ill., a corporation of Delaware No Drawing. Application April 2, 1947, Serial No. 738,935

4 Claims. (Cl. 18—47.5)

This invention relates to the production of improved dense coherent carbon masses from certain normally infusible carbonaceous residues commonly derived from petroleum, or from tar and pitches, and to improved carbon electrodes, or other carbon articles, composed of or formed therewith.

More particularly, my invention is characterized by the employment and hot-molding of certain carbonaceous residues which are hereinafter more specifically described and designated as "asphaltenic residues."

In one specific embodiment, the invention relates to the production of the improved dense massive carbon for electrodes and the like by subjecting the aforesaid carbonaceous material to specific conditions of hot-molding without binder to autogenously form a coherently homogeneous mass largely free from voids which has a reduced pore-forming tendency when carbonized, followed by calcining the mass until substantially carbonized to produce an improved dense carbon having a relatively low porosity uniformly distributed as microscopic voids.

In another specific embodiment the invention relates to the production of improved carbon electrodes and other articles of like composition by making a molding mixture comprising relatively large particles of the improved dense carbon in the form of a crushed carbon aggregate together with the usual kinds of coke or carbon in relatively small particle size ("flour") and a binder such as pitch, in which mixture the latter two components, particularly the binder, are advantageously proportioned to suit the novel properties of the improved dense carbon particles, followed by molding and baking the mixture to produce the carbon article.

In another specific embodiment, my invention relates to the production of carbon electrodes and other articles by hot-molding a pulverized mixture composed of a major proportion of said carbonaceous residue together with a minor proportion of more completely carbonized material which may be of the same general origin, such as fully calcined petroleum coke.

It is known to subject carbonaceous residues derived from petroleum and related hydrocarbons to coking in retorts, by-product ovens or rotary kilns, etc., at temperatures of 800° C. or more and thus obtain a carbon or coke. Such cokes, however, generally consist in a non-uniform highly porous and cellular structure. When this coke is crushed to say, 4 mesh particles, a size frequently used in the production of carbon electrodes, such particles do not have the most desirable properties. For example, the porosity of the particle is excessive and its apparent density consequently low; a particle porosity of about 36% by volume and an apparent particle density of about 1.4 are not uncommon. Put another way, the bulk density of an 8-20 mesh coke particle aggregate (gravity packed) is rather low, lying in the range of 0.55-0.72.

As distinguished from the foregoing, for the improved dense carbon resulting from the practice of the present invention, a 4-mesh particle density of 1.72 with a particle porosity of approximately 18%, or an aggregate bulk density (gravity packed) for 8-20 mesh particles of about 1.0 are typical.

In the practice of my invention, I employ a dry (i. e., no water) non-melting or infusible carbonaceous material comprising carbonaceous residues derived from petroleum, tars, pitches or from natural asphalts such as gilsonite, and the like. The carbonaceous residues are products derived from the described source materials by means of distillation, cracking, solvent extraction, etc. An example of such carbonaceous residue is the so-called raw petroleum coke which may be obtained with varied properties in the distillation and cracking of petroleum crudes. Those residues that I employ are generally of a loose or porous nature, are non-melting or infusible and for my purposes must contain, within limits, potentially volatile organic matter which can be evolved for the most part only upon pyrolysis and carbonization of the residue. These residues consist for the most part of varying proportions of asphaltenes and more highly condensed carbonaceous substances; both will carbonize without melting. The latter component is substantially insoluble in any solvent; the asphaltenes are largely soluble in carbon disulfide but are insoluble in non-aromatic light hydrocarbon solvents.

These carbonaceous residues may in some instances also contain oily constituents which are not objectionable unless present in excessive amounts, say more than about 10% of the residue, and then because of being highly volatile and of low coking value tend to make my final products somewhat porous.

The pyrolytic volatile content of the carbonaceous residues employed derives primarily from the asphaltenes contained therein. This volatile content is used as the criterion for suitability of carbonaceous residues to this invention and must be at least 7% and not more than 22% by weight thereof.

Although the foregoing described carbonaceous residues are known generally as "raw petroleum coke," I use the term "asphaltenic residue" in this specification and the claims as the more descriptive one to designate the non-melting carbonaceous residues having an organic pyrolytic volatile content from 7% to 22% by weight thereof which I have found to be suitable for my purposes.

It is also within the scope of my invention as previously indicated, to employ as my starting material mixtures comprising asphaltenic residues and a minor proportion of a substantially carbonized material of the same origin, such as fully carbonized petroleum coke, coke from coal or other carbon, for the production of my improved dense carbon. I may also employ such mixtures advantageously for the direct production, by my method of hot-molding, certain finished carbon articles such as commutator brushes, anodes and heat refractories, particularly where minimum product porosity, control of shrinkage during baking or substantially shortening the time of bake over that for the usual molded pitch-bound coke articles is to be desired.

I have found that asphaltenic residues containing from 7% to 22% pyrolytic volatile matter and preferably within the limits of from about 10% to about 18% undergo substantial coalescence or consolidation without the aid of added binder when the material is subjected to certain conditions of hot-molding even though the material is non-melting. Below 7% volatile content the carbonaceous material has no appreciable self-binding property. Above about 18% pyrolytic volatile content, the hot molded asphaltenic residue while possessing an excellent self-binding property tends to intumesce or swell when calcined and which under some circumstances would defeat the purpose of this invention to produce an improved dense carbon. Above 22% pyrolytic volatile content, the hot-molded carbonaceous residue is too intumescent in calcination and is unsatisfactory for my purposes.

I have further found that certain conditions of upheat, molding temperatures and molding pressures must be observed for producing dense coherent carbon masses from asphaltenic residues. The material must be rapidly heated up to the molding temperature, i. e., at an upheat rate of more than one degree centigrade per minute, under a substantially non-oxidizing condition. By substantially non-oxidizing condition is meant in its simplest and yet effective form, externally heating the material in a closed container, preferably agitated, and from which the surrounding air is thereby excluded. Another more effective means for heating is by direct heat transfer of the material against a hot non-oxidizing flue gas through such as a rotary kiln. After having been rapidly brought to the molding temperature, it is essential to subject the material to molding within an hour thereafter, preferably immediately for best results. The reason is that the self-binding property of the asphaltenic residue is diminished or even destroyed by prolonged heating at the temperatures I employ. In order to secure substantial coalescence and self-binding to a coherent mass, the material must be heated as described to a temperature between about 250° C. and 450° C. and be molded thereat under a mechanically applied pressure exceeding about 2,000 pounds per square inch in any die of suitable size or shape; the forming may be by press-molding or by extruding. I prefer to employ pressures of from 3,000 to 10,000 pounds per square inch.

Mixtures of such asphaltenic residue with a substantially carbonized coke or other carbon and containing at least about but preferably more than 50% by weight of the residue possess to a large degree the self-binding property of the residue when subjected to my conditions of hot-molding. It is desirable, however, to hot-mold such mixtures at temperatures about 25° to 50° C. higher and pressures at least about 1,000 pounds higher than for the asphaltenic residue alone. To secure the highest degree of autogenous binding in such mixture to form coherent masses, I prefer to employ therein an asphaltenic residue containing from 12% to 22% pyrolytic volatile matter.

In the general practice of my invention, the asphaltenic residue, or admixtures thereof with fully carbonized material such as calcined petroleum coke, is first pulverized to about 50 mesh and finer to insure uniformity in both the raw material and the subsequently formed consolidated product. The pulverized material is rapidly heated as described above to the molding temperature before charging to a heated die and applying the pressure. Alternatively, I may charge unheated pulverized material to the hot die, letting it come up to a temperature during the application of pressure. I have found, however, that heating up the pulverized material as rapidly as possible prior to the hot-molding thereof is to be preferred. The die pressure is sustained only sufficiently long to autogenously bind together the asphaltenic residue. This may be a matter of seconds or several minutes and depends on such factors as temperature, the magnitude of the pressure, the pyrolytic volatile content of the asphaltenic residue, and to some extent upon the amount of the fully carbonized coke that may form a part of the mixture. I may in some cases release the initial pressuring to allow escape of any volatiles generated followed by repressuring to complete the molding operation. In some instances I may also cool the die after molding and with or without maintaining the pressure and then eject the molded piece.

The molded coherent solid product is then carbonized by calcining it to temperatures of from about 1000° C. to about 1400° C. to obtain the improved dense massive carbon having relatively low porosity uniformly distributed as microscopic voids.

Due to the physical nature and chemical constitution of the hot-molded material, relatively high rates of calcination may be used without causing swelling or disruption during carbonization. For instance, a very rapid upheat calcination to 1400° C., such as for example 30° C. per minute, can readily be employed which means that approximately one or at most only a few hours need be taken to completely carbonize my hot-molded products. The commonly known pitch-bound coke articles require many days to complete their carbonization and the porosity thereof may be from 30 to 40% greater than for my improved dense carbon.

My calcined product is a superior raw material for the manufacture of pitch-bond electrodes and the like as previously indicated, when it is crushed to relatively large particle sizes for use therein.

This calcined product in whole condition may constitute directly various carbon articles as also previously indicated. When a dense graphitized carbon is desired, the calcined product may be graphitized by further heat treatment in known ways.

The following specific examples are given to make clear and illustrate the practice, but not limit, the foregoing described invention:

Example I

Granular dense carbon was made as follows: Asphaltenic residue with a pyrolytic volatile content of 13.8% was pulverized to pass a 50 mesh sieve, rapidly heated with agitation to 350° C. in an electrically heated mixer closed to the atmosphere and thereafter it was immediately press-molded at this temperature with a mechanical contacting pressure of 6000 lbs./sq. inch in a heated one-inch diameter cylindrical die. Cylindrical pieces thus formed were strongly coherent and coalesced to substantially zero porosity. These were completely carbonized by calcining to 1300° C. at an upheat rate of 30° C. per minute, about 45 minutes total heating time being required in an externally heated furnace. At no time was swelling or intumescence observed during the calcination, but rather, a uniform and gradual shrinkage occurred. The broken surface of the calcined cylinders showed a fine close-grained non-cellular appearance. The 4 mesh particles thereof have a particle density 1.72 and microscopic voids amounting to 18% of the particle. The bulk density of a gravity packed 8–20 mesh particle aggregate of the above improved carbon was 0.98.

Example II

Carbon anodes, one inch in diameter were made as follows. A pulverized mixture containing 55% of asphaltenic residue having a pyrolytic volatile matter below 22%, and 45% of a petroleum coke which had been calcined at 1300° C. was charged without prior heating into a die held at 380° C. A mechanical pressure of 6000 pounds per square inch was applied thereto and sustained for about 10 minutes after which the die was cooled to about 270° C. and the piece ejected. Dense and highly coherent green carbon anodes were thus produced. These were loosely stacked in an externally heated furnace and calcined to 1300° C. during about one hour. There was no tendency in the calcination for the pieces to stick together or to become distorted in shape. Several of the calcined anodes were further heat treated at about 2800° C. to produce graphitized anodes having desirable properties for low temperature aqueous electrolytic processes. Other articles such as carbon brushes may thus also be made by using a molding die of dimension suited to such purpose.

I have found that certain definite advantages are to be gained by using the improved dense carbon made according to the practice of my invention, such as that illustrated in Example I, as the relatively large particle sized or granular portion of a carbon aggregate for the production of carbon articles usually bound with pitch. For instance, the low and uniform microscopic pore voids and high strength of my improved dense carbon permits the use of large sized particles thereof in carbon aggregates used with a binder. Moreover, the improved condition of porosity in my dense carbon provides a substantially reduced selective absorption of the lighter components of the usual binders which are all heterogeneous hydrocarbonaceous mixtures. The selective adsorption of the binder by the highly porous calcined cokes heretofore employed, perhaps not generally recognized, is often very troublesome. Selective absorption of the binder reduces the inter-particle bonding strength of the remaining binder components. With a decreased absorption and to some extent the use of larger particle sizes of my improved dense carbon in the molding aggregate, less binder will be required. As much as 25% reduction in binder requirements have been realized for carbon aggregates comprising my improved dense carbon. The net result is a highly desirable improvement both in manufacture and quality in the baked pitch-bound type of carbon electrode and other carbon articles of like composition.

The production of improved pitch-bound carbon electrodes is illustrated in the following example.

Example III

Pitch-bound carbon electrodes comprising 8–20 mesh particles of the improved dense carbon produced according to Example I were made as follows. A mixture consisting of parts by weight, 65 of 8–20 mesh particles of the dense carbon of Example I, 35 of calcined petroleum coke flour and 22 of coal tar pitch (melting point 92° C.) was prepared in a dough type mixer at about 160° C. during 30 minutes mixing time; one part summer oil was added a few minutes before completing the mix. The mixture was extruded at 115° C. and 3700 pounds per square inch to form green carbon electrodes which were baked 8 days to 950° C. The resulting carbon electrodes had an apparent density of 1.58, a cross-binding strength of 2080 pounds per square inch, and a resistivity of 0.0021 ohm per inch cube. A similar mixture employing the usual highly porous calcined petroleum coke for the 8–20 mesh particles instead of my dense carbon required 5 parts less of such coke particles and 18% more binder to give a mixture that could be satisfactorily extruded; yet the resulting baked electrodes were inferior, especially as regards strength, to those containing my improved dense carbon.

I claim as my invention:

1. A method of forming shaped carbon bodies which comprises hot molding crushed particles of a normally infusible, raw uncalcined coke derived from cracking of heavy liquefiable hydrocarbon mixtures, said coke containing and being capable of evolving from about 10% to about 18% of volatile organic matter only upon carbonization of said coke, conducting said molding under pressure at a temperature of about 250° C. to about 450° C. to autogenously bond the particles into a dense, coherent, shaped body, and carbonizing the material so produced.

2. A method of forming dense carbon bodies of low porosity, which comprises crushing a carbonaceous residue produced by coking a heavy liquefiable hydrocarbon mixture under conditions such that it contains about 7% to about 22% volatile matter evolvable only upon carbonization of the coke, rapidly heating the particles to a temperature of 250° C. to 450° C., coalescing and compacting it autogenously under a mechanical pressure in excess of about 2,000 p. s. i., and then carbonizing the particles, the sole binder being said volatile matter contained in said particles.

3. A method of forming dense carbon of low porosity, which comprises coking a heavy liquefiable hydrocarbon mixture under conditions to produce an infusible residue containing about 7% to about 22% of volatile matter capable of being evolved only upon carbonization of said residue, crushing said residue, rapidly heating the particles without addition of extraneous binder to a temperature of about 250° C. to about 450° C. and promptly coalescing the particles at a pressure in excess of 2,000 p. s. i. to autogeneously bond them into a dense coherent mass.

4. The product formed by the process of claim 3.

LLOYD C. SWALLEN.

REFERENCES CITED

The following references are of record in the file of this patent:

UNITED STATES PATENTS

| Number | Name | Date |
| --- | --- | --- |
| Re. 18,062 | Doerschuk | May 5, 1931 |
| 598,646 | Saunders | Feb. 8, 1898 |
| 1,392,267 | Szarvasy | Sept. 27, 1921 |
| 2,356,076 | Moberly | Aug. 15, 1944 |